United States Patent
Barber et al.

(10) Patent No.: US 6,637,658 B2
(45) Date of Patent: Oct. 28, 2003

(54) OPTICAL READER HAVING PARTIAL FRAME OPERATING MODE

(75) Inventors: Charles P. Barber, Fayetteville, NY (US); Carl W. Gerst, III, Boston, MA (US); George S. Smith, II, Manlius, NY (US); Robert M. Hussey, Camillus, NY (US); Robert Gardiner, Fayetteville, NY (US); Matthew Pankow, Camillus, NY (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 153 days.

(21) Appl. No.: 09/766,806

(22) Filed: Jan. 22, 2001

(65) Prior Publication Data

US 2003/0062418 A1 Apr. 3, 2003

(51) Int. Cl.[7] ................................................ G06K 7/10
(52) U.S. Cl. .................... 235/462.45; 235/462.09; 235/462.1; 235/462.11; 235/462.12; 235/462.25
(58) Field of Search .................. 235/462.45, 462.25, 235/462.1, 462.09, 462.11, 462.12

(56) References Cited

U.S. PATENT DOCUMENTS

| | | | | |
|---|---|---|---|---|
| 4,794,239 A | * | 12/1988 | Allais | 235/462.1 |
| 4,818,856 A | * | 4/1989 | Matsushima et al. | 235/454 |
| 5,506,880 A | | 4/1996 | Scardino et al. | |
| 5,619,597 A | | 4/1997 | Moreton | |
| 5,621,203 A | * | 4/1997 | Swartz et al. | 235/462.11 |
| 5,657,395 A | | 8/1997 | Hirota | |
| 5,692,062 A | | 11/1997 | Lareau et al. | |
| 5,710,417 A | | 1/1998 | Joseph et al. | 235/462 |
| 5,717,602 A | | 2/1998 | Kenning | |
| 5,739,518 A | * | 4/1998 | Wang | 235/462.09 |
| 5,929,418 A | | 7/1999 | Ehrhart et al. | 235/462 |
| 5,969,753 A | | 10/1999 | Robinson | |
| 5,979,768 A | * | 11/1999 | Koenck | 235/462.12 |
| 5,984,186 A | | 11/1999 | Tafoya | 235/462.24 |
| 6,044,180 A | | 3/2000 | Brandestini et al. | |
| 6,047,085 A | | 4/2000 | Sato et al. | |
| 6,141,046 A | | 10/2000 | Roth et al. | |
| 6,175,357 B1 | | 1/2001 | Gordon | |
| 6,177,999 B1 | | 1/2001 | Wurz et al. | |
| 6,229,921 B1 | | 5/2001 | Wenzel et al. | |
| 6,233,011 B1 | | 5/2001 | Su | |
| 6,240,218 B1 | | 5/2001 | Michael et al. | |
| 6,246,779 B1 | | 6/2001 | Fukui et al. | |
| 6,267,501 B1 | | 7/2001 | Wand et al. | |
| 6,268,848 B1 | | 7/2001 | Eglit | |
| 6,268,883 B1 | | 7/2001 | Zehnder et al. | |
| 6,268,918 B1 | | 7/2001 | Tanabe et al. | |
| 6,360,948 B1 | * | 3/2002 | Yang et al. | 235/375 |

FOREIGN PATENT DOCUMENTS

WO   WO 93/18478   9/1993

* cited by examiner

*Primary Examiner*—Michael G. Lee
*Assistant Examiner*—Steven S. Paik
(74) *Attorney, Agent, or Firm*—Wall Marjama & Bilinski LLP

(57) ABSTRACT

The invention is an optical reader having a 2D image sensor that is configured to operate in a partial frame capture mode. In a partial frame operating mode, the reader clocks out and captures at least one partial frame of image data having image data corresponding to less than all of the pixels of an image sensor pixel array. In one embodiment, the reader operating in a partial frame operating mode captures image data corresponding to a linear pattern of pixels of the image sensor, reads the image data, attempts to decode for a decodable 1D symbol which may be represented in the image data, and captures a full frame of image data if the image data reading reveals a 2D symbol is likely to be present in a full field of view of the 2D image sensor.

17 Claims, 6 Drawing Sheets

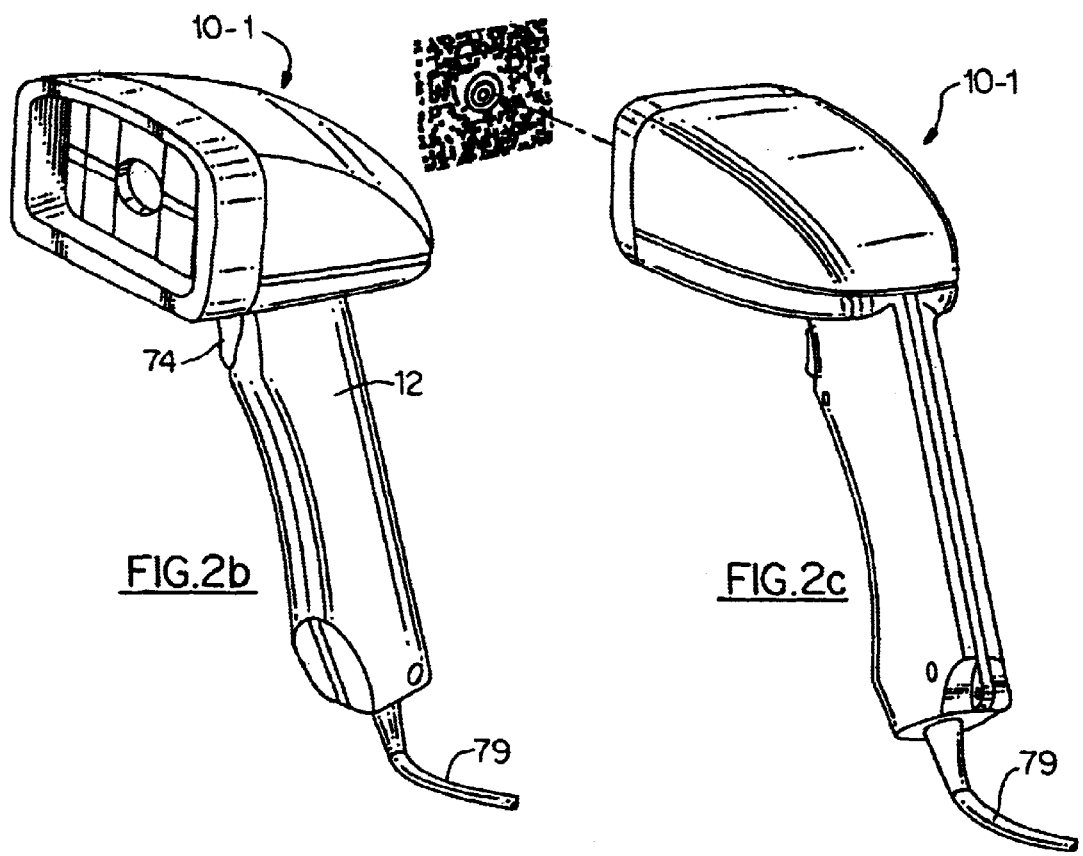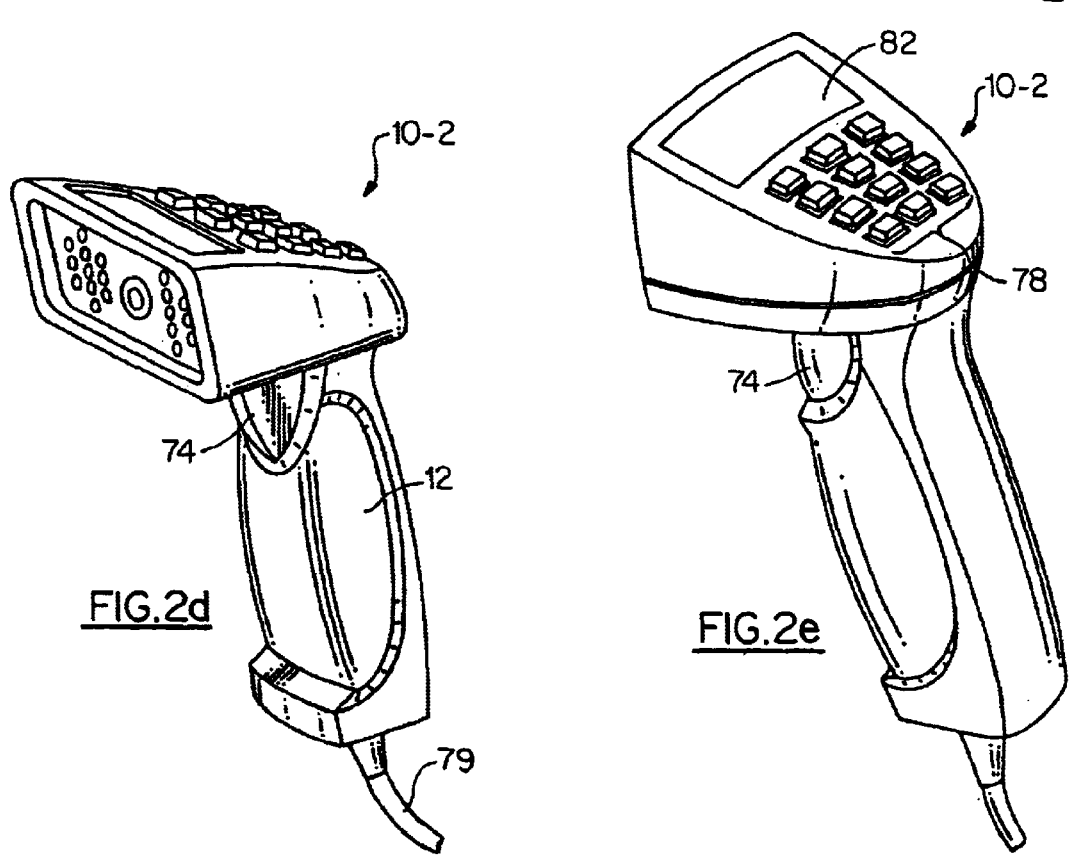

OPTICAL READER HAVING PARTIAL FRAME OPERATING MODE

FIELD OF THE INVENTION

The invention relates to optical readers in general and in particular to a method for operating an optical reader having a 2D image sensor.

BACKGROUND OF THE PRIOR ART

Optical readers having 2D image sensors commonly are used to read both 1D and 2D symbols. Some optical readers having a 2D image sensor read a 1D symbol by capturing a 2D image representation, or "frame" of image data corresponding to a target area which comprises a 1D symbol, and launching a scan line or lines in order to attempt to decode for 1D symbols which may be represented in the area. Other optical readers having 2D image sensors read 1D symbols by capturing a 2D image representation of an area containing the 1D symbol, preliminarily analyzing the image data represented in the area to determine that the image data comprises a representation of a 1D symbol, and then launching a scan line in an attempt to decode for the 1D symbol determined to be present. In either case, a full frame 2D image representation is captured in order to decode for a 1D symbol.

Capturing a 2D image representation requires a substantial amount of time, especially in applications wherein one or more "test" frames of image data must be captured prior to capture of a frame that is subjected to processing as are explained in commonly assigned application Ser. No. 09/766,922 entitled "Optical Reader Having Reduced Parameter Determination Delay" filed concurrently herewith and incorporated herein by reference. Furthermore, assuming a constant processing speed, the dine required for an optical reader to capture a 2D image representation increases with the resolution of the image sensor which is incorporated in the reader. Currently available CMOS mega pixel image sensors have low frame clock out rates of about 15 frames per second (FFS).

A user's satisfaction with an optical reader often varies directly with the decoding speed of the optical reader. Given that higher resolution, including mega pixel readers, are expected to grow in popularity, the frame capture time will become an increasingly important factor for consideration in performance of an optical reader.

SUMMARY OF THE INVENTION

The invention is a method for configuring an optical reader having a 2D image sensor so the reader captures and processes image data at higher speeds.

According to the invention, a control circuit of an optical reader equipped with a 2D image sensor is configured to operate in a partial frame operating mode. In a partial frame operating mode, the control circuit clocks out and captures less than a full frame of image data and processes that image data. The control circuit may process the image data of the partial frame, for example, by reading the image data from memory and outputting the image data to an output location such as a display device or a processor system in communication with the reader, by reading and attempting to decode decodable symbols which may be recorded in the partial frame, or by reading and performing optical character recognition on characters represented in the partial frame of image data.

In one embodiment, the partial frame operating mode is employed to clock out and capture image data corresponding to at least one linear pattern sufficient so that a 1D symbol in the field of view of the image sensor may be decoded without clocking out and capturing an entire frame of image data. The partial frame of image data that is clocked out from the image sensor during the partial frame capture operating mode may be, for example, a row of symbols at or near the center of the image sensor or a limited number of lines of image data corresponding to pixel locations of the image sensor, possibly at varying angular orientations. The control circuit may be configured so that if the control circuit cannot decode a 1D symbol during the course of operating in the partial frame capture mode, or detects that a 2D symbol is represented in the captured image data, the control circuit switches operation to a full frame capture mode.

In another embodiment, the partial frame operating mode is employed to clock out and capture pixel values corresponding to a grouping of pixels at or near a center of an image sensor other than a linear pattern of pixels. This embodiment may be advantageously employed in cases where decodable symbols are expected to be concentrated proximate a center of an image sensor's field of view. A control circuit may be configured so that if the control circuit cannot decode a symbol represented in the partial frame, or determines that a symbol is represented partially or entirely outside the image data of the partial frame, the control circuit automatically switches operation to a full frame image capture mode.

These and other details, advantages and benefits of the present invention will become apparent from the detailed description of the preferred embodiment hereinbelow.

BRIEF DESCRIPTION OF THE DRAWINGS

For a fuller understanding of the nature and objects of the present invention reference should be made to the following detailed description of the invention which is to be read in conjunction with the associated drawings wherein:

FIGS. 2b–2h show various types of optical reader housings in which the invention may be incorporated.

DETAILED DESCRIPTION OF THE INVENTION

Figure 1A:
FIGS. 1a–1g illustrate various image data patterns that may be captured by an optical reader operating in a partial frame capture mode according to the invention.

Referring to FIGS. 1a–1g the invention is an optical reader equipped with a 2D image sensor that is configured to operate in a partial frame capture mode. In a partial frame clock out mode, a control circuit of an optical reader clocks out (or "reads") electrical signals corresponding to less than all of the 2D image sensor's pixels, and captures image data corresponding to the pixel locations into memory.

Partial frames of image data which may be clocked out and captured by an optical reader control circuit during a partial frame capture mode are illustrated in FIGS. 1a–1g in which valid zones 12 represent frame image data corresponding to image sensor pixel positions that are clocked out and invalid zones 14 represent potential image data positions corresponding to pixel positions that are not clocked out.

Border 10 defines the full field of view of an optical reader in the case the reader is operated in a full frame captured mode while symbols 16-1, 16-2, 16-3, 16-4, 16-5, 16-6 and 16-7 are symbols entirely within the full field of view of an optical reader defined by border 10 but are only partially within certain valid zones shown. Valid zones 12-1, 12-3, 12-7, 12-8, 12-9, 12-10, and 12-13 are valid zones of image data that partially contain representations of a decodable symbol while valid zones 12-11 and 12-12 are valid zones of image data captured during a partial frame capture mode which contain representations of an entire decodable symbol.

In the examples illustrated with reference to FIGS. 1a–1e an optical reader operating in a partial frame clock out mode clocks out electrical signals corresponding to linear patterns of pixels. It is useful to cause a reader to clock out electrical signals corresponding to linear patterns as shown in FIGS. 1a–1d when a reader will be used to decode mainly 1D linear bar code symbols.

In the examples illustrated with reference to FIGS. 1f and 1g an optical reader operating in a partial frame clock out mode clocks out electrical signals corresponding to non-linear groupings of pixels. It is useful to cause a reader to clock out electrical signals corresponding to pixel groupings as shown in FIGS. 1f and 1g when a reader will be used to decode symbols which are expected to be within a certain position in an image sensor's field of view.

A reader may be configured so that the reader automatically switches out of partial frame capture mode on the sensing of a certain condition. For example a reader according to the invention may be made to switch out of partial frame capture operating mode and into a full frame capture mode on the sensing that a 2D symbol is partially represented in the partial frame of image data, or on the condition that processing of the partial frame of image data fails to result in image data being decoded.

An optical reading system in which the invention may be employed is described with reference to the block diagram of FIG. 2a.

Optical reader 110 includes an illumination assembly 120 for illuminating a target object T, such as a 1D or 2D bar code symbol, and an imaging assembly 130 for receiving an image of object T and generating an electrical output signal indicative of the data optically encoded therein. Illumination assembly 120 may, for example, include an illumination source assembly 122, together with an illuminating optics assembly 124, such as one or more lenses, diffusers, wedges, reflectors or a combination of such elements, for directing light from light source 122 in the direction of a target object T. Illumination assembly 120 may comprise, for example, laser or light emitting diodes (LEDs) such as white LEDs or red LEDs. Illumination assembly 120 may include target illumination and optics for projecting an aiming pattern 127 on target T. Illumination assembly 120 may be eliminated if ambient light levels are certain to be high enough to allow high quality images of object T to be taken. Imaging assembly 130 may include an image sensor 132, such as a 1D or 2D CCD, CMOS, NMOS, PMOS, CID OR CMD solid state image sensor, together with an imaging optics assembly 134 for receiving and focusing an image of object T onto image sensor 132. The array-based imaging assembly shown in FIG. 2a may be replaced by a laser array based imaging assembly comprising multiple laser sources, a scanning mechanism, emit and receive optics, at least one photodetector and accompanying signal processing circuitry.

The partial frame clock out mode is readily implemented utilizing an image sensor which can be commanded to clock out partial frames of image data or which is configured wit pixels that can be individually addressed. Using CMOS fabrication techniques, image sensors ate readily made so that electrical signals corresponding to certain pixels of a sensor can be selectively clocked out without clocking out electrical signals corresponding to remaining pixels of the sensor. CMOS image sensors are available from such manufacturers as Symagery, Pixel Cam, Omni Vision, Sharp, National Semiconductor, Toshiba, Hewlett-Packard and Mitsubishi. A partial frame clock out mode can also be carried out by selectively activating a frame discharge signal during the course of clocking out a frame of image data from a CCD image sensor, as is explained in concurrently filed application Ser. No. 09/766,922, entitled "Optical Reader Having Reduced Parameter Determination Delay," incorporated previously herein by reference.

Figure 2A:
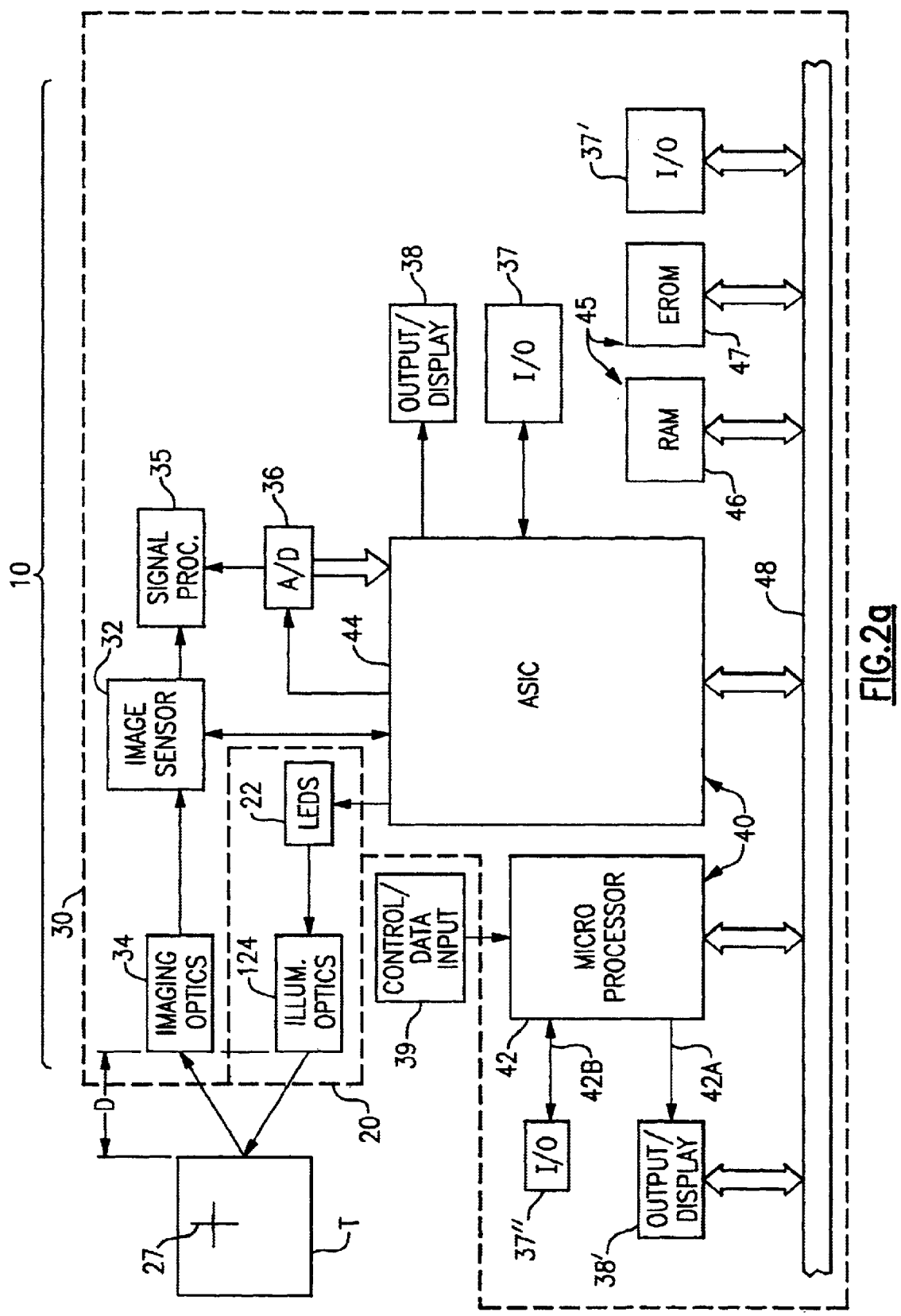
FIG. 2a is a block diagram of an optical reader of a type in which the invention may be incorporated.
Figures 2F, 2G:
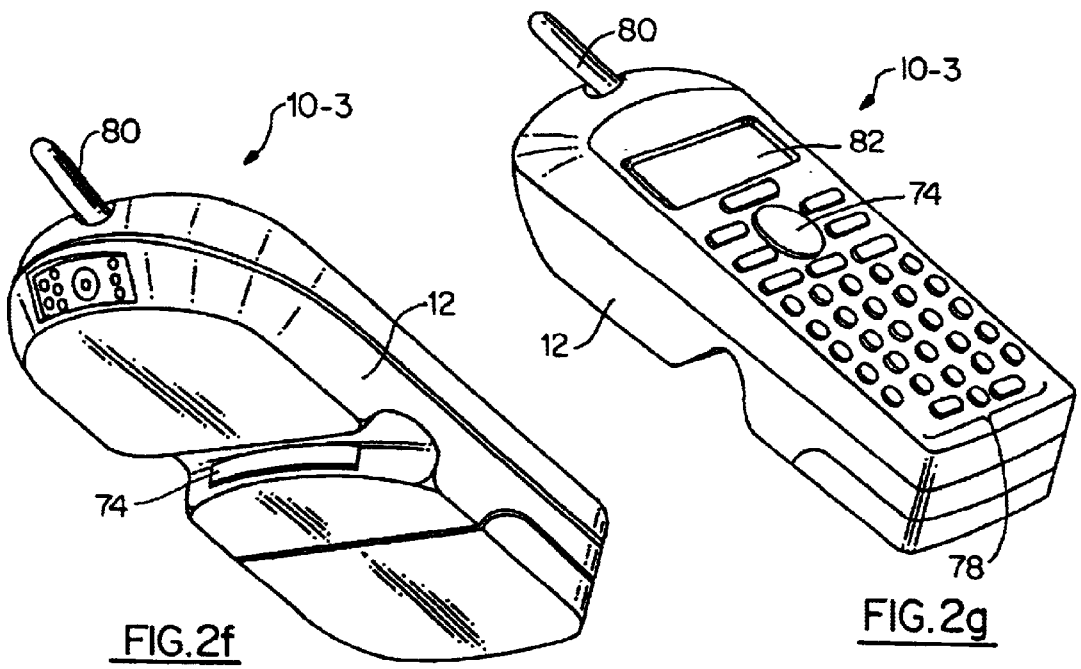

Optical reader 110 of FIG. 2a also includes programmable control circuit 140 which preferably comprises an integrated circuit microprocessor 142 and an application specific integrated circuit (ASIC 144). The function of ASIC 144 could also be provided by field programmable gate array (FPGA). Processor 142 and ASIC 144 are both programmable control devices which are able to receive, output and process data in accordance with a stored program stored in memory unit 145 which may comprise such memory elements as a read/write random access memory or RAM 146 and an erasable read only memory or EROM 147. RAM 146 typically includes at least one volatile memory device but may include one or more long term non-volatile memory devices. Processor 142 and ASIC 144 are also both connected to a common bus 148 through which program data and working data, including address data, may be received and transmitted in either direction to any circuitry that is also connected thereto. Processor 142 and ASIC 144 differ from one another, however, in how they are made and how they are used.

More particularly, processor 142 is preferably a general purpose, off-the-shelf VLSI integrated circuit microprocessor which has overall control of the circuitry of FIG. 2a, but which devotes most of its time to decoding image data stored in RAM 146 in accordance with program data stored in EROM 147. Processor 144, on the other hand, is preferably a special purpose VLSI integrated circuit, such as a programmable logic or gate array, which is programmed to devote its time to functions other than decoding image data, and thereby relieve processor 142 from the burden of performing these functions.

The actual division of labor between processors 142 and 144 will naturally depend on the type of off-the-shelf microprocessors that are available, the type of image sensor which is used, the rate at which image data is output by imaging assembly 130, etc. There is nothing in principle, however, that requires that any particular division of labor be made between processors 142 and 144, or even that such a division be made at all. This is because special purpose processor 144 may be eliminated entirely if general purpose processor 142 is fast enough and powerful enough to perform all of the functions contemplated by the present invention. It will, therefore, be understood that neither the number of processors used, nor the division of labor there between, is of any fundamental significance for purposes of the present invention.

With processor architectures of the type shown in FIG. 2a, a typical division of labor between processors 142 and 144 will be as follows. Processor 142 is preferably devoted primarily to such tasks as decoding image data, once such data has been stored in RAM 146, recognizing characters represented in stored image data according to an optical character recognition (OCR) scheme, handling menuing options and reprogramming functions, processing commands and data received from control/data input unit 139 which may comprise such elements as trigger 174 and keyboard 178 and providing overall system level coordination.

Processor 144 is preferably devoted primarily to controlling the image acquisition process, the A/D conversion process and the storage of image data, including the ability to access memories 146 and 147 via a DMA channel. Processor 144 may also perform many timing and communication operations. Processor 144 may, for example, control the illumination of LEDs 122, the timing of image sensor 132 and an analog-to-digital (A/D) converter 136, the transmission and reception of data to and from a processor external to reader 110, through an RS-232, a network such as an ethernet, a serial bus such as USB, a wireless communication link (or other) compatible I/O interface 137. Processor 144 may also control the outputting of user perceptible data via an output device 138, such as a beeper, a good read LED and/or a display monitor which may be provided by a liquid crystal display such as display 182. Control of output, display and I/O functions may also be shared between processors 142 and 144, as suggested by bus driver I/O and output/display devices 137' and 138' or may be duplicated, as suggested by microprocessor serial I/O ports 142A and 142B and I/O and display devices 137' and 138'. As explained earlier, the specifics of this division of labor is of no significance to the present invention.

Some or all of the above optical and electronic components may be incorporated in an imaging module as are described in commonly assigned application Ser. No. 09/411,936, incorporated herein by reference.

FIGS. 2b–2g show examples of types of housings in which the present invention may be incorporated. FIGS. 2b–2g show 1D/2D optical readers 110-1, 110-2 and 110-3. Housing 112 of each of the optical readers 110-1 through 110-3 is adapted to be graspable by a human hand and has incorporated therein at least one trigger switch 174 for activating image capture and decoding and/or image capture and character recognition operations. Readers 110-1 and 110-2 include hard-wired communication links 179 for communication with external devices such as other data collection devices or a host processor, while reader 110-3 includes an antenna 180 for providing wireless communication device or a host processor.

In addition to the above elements, readers 110-2 and 110-3 each include a display 182 for displaying information to a user and a keyboard 178 for enabling a user to input commands and data into the reader. Control circuit 140 may cause a graphical user interface (GUI) to be displayed on display 182. A pointer on the GUI may be moved by an actuator or actuators protruding from housing 112.

Figure 2H:
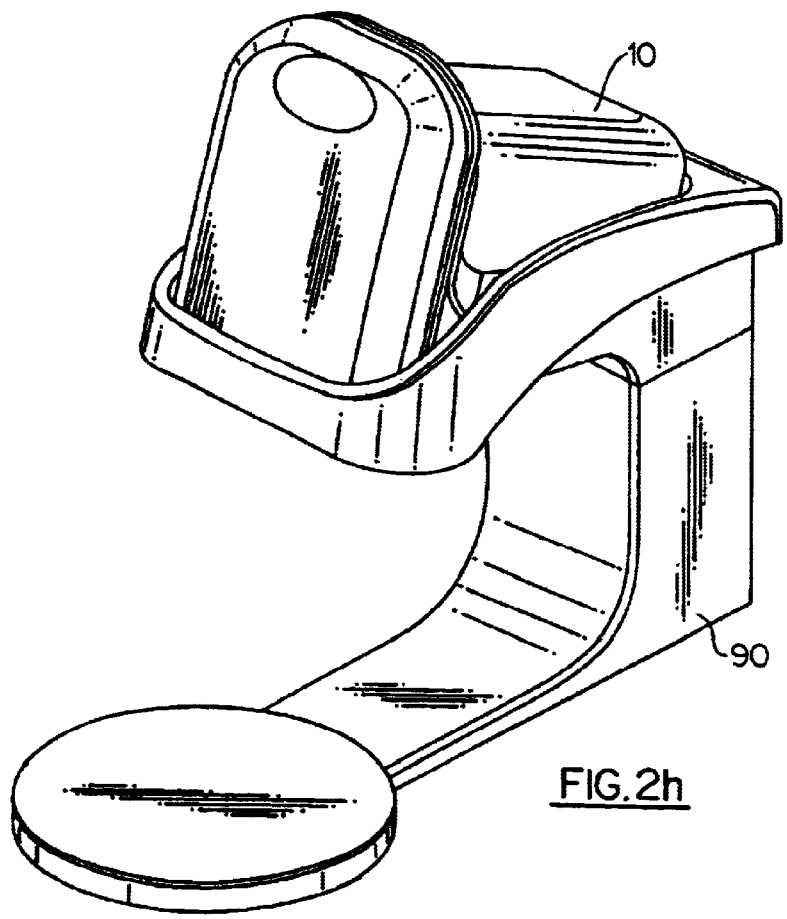

Any one of the readers described with reference to FIGS. 2b–2g may be mounted in a stationary position as is illustrated in FIG. 2h showing a generic optical reader 110 docked in a scan stand 190. Scan stand 190 adapts portable optical reader 110 for presentation mode scanning. In a presentation mode, reader 110 is held in a stationary position and an indicia bearing article is moved across the field of view of reader 110.

As will become clear from the ensuing description, the invention need not be incorporated in a portable optical reader. The invention may also be incorporated, for example, in association with a control circuit for controlling a nonportable fixed mount imaging assembly that captures image data representing image information formed on articles transported by an assembly line, or manually transported across a checkout counter at a retail point-of-sale location. Further, in portable embodiments of the invention, the reader need not be hand held. The reader may part or wholly hand worn, finger worn, waist worn or head worn for example.

Referring again to particular aspects of the invention, control circuit 140 in the example of FIG. 1a executes a partial frame capture mode in order to clock out and capture pixel data illustrated by valid zone 12-1. Reading the pixel values of valid zone 12-1 is effective to decode 1D symbol 16-1 in the reader's full field of view. Given that clocking out and capturing image data of valid zone 12-1 consumes less time than clocking out and capturing a full frame of image data, it is seen that execution of a partial frame capture mode decreases the decode time of the reader. In prior art 2D optical readers, electrical signals corresponding to full frame 10 are clocked out in order to decode a single 1D symbol 16-1. The pixels of valid zone 12-1 may comprise a single row of pixels (a scan line) or a plurality of rows.

Figure 1B:
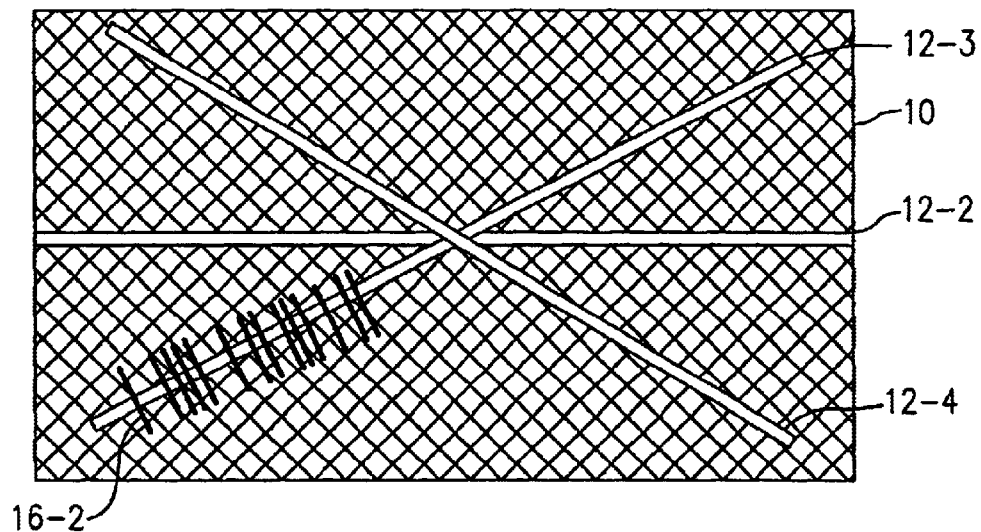

In the example of FIG. 1b, of control circuit 40 executes a partial frame capture mode in order to capture data defining valid zones 12-2, 12-3 and 12-4 of a full frame of image data corresponding to a full field of view of a 2D image sensor. Valid zones 12-2, 12-3 and 12-4 are line patterns of image data at various angular orientations. Reading of pixels of line valid zones arranged at various angular orientations is effective to decode a 1D symbol which may be located at an oblique angle in a field of view. It is seen that reading of pixels of line valid zone 12-3 will result in the successful decoding of 1D bar code symbol 16-2. Zones 12-2, 12-3 and 12-4 may be one or more pixels wide.

Figure 1C:
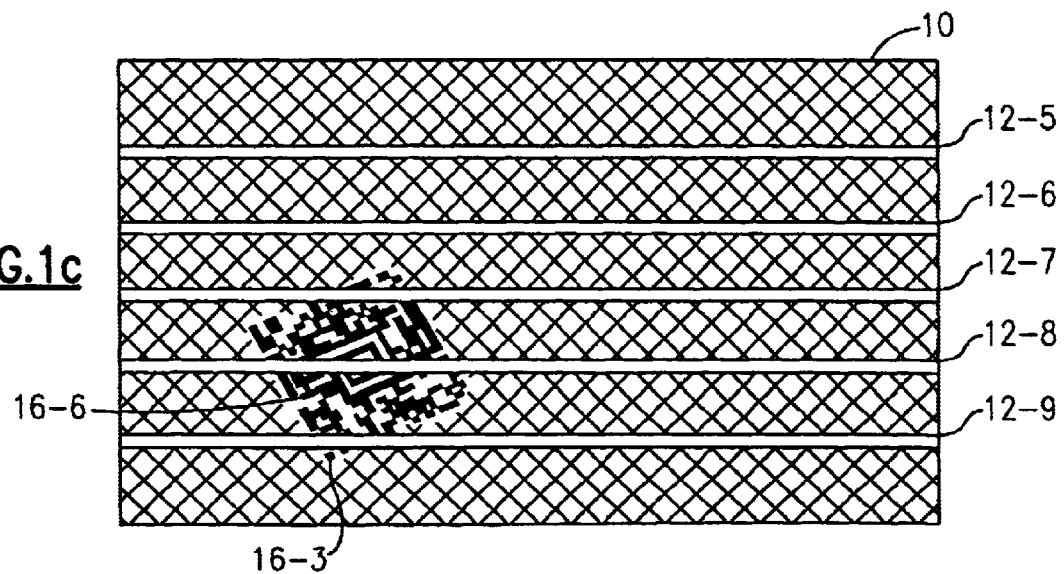

In the example of FIG. 1c, control circuit 40 executes a partial frame capture mode in order to clock out and capture image data defining valid zones 12-5 and 12-9. Valid zones 12-5 to 12-9 form a plurality of horizontal parallel lines. The pattern of valid zones shown in FIG. 1c clocked out and captured in a partial frame capture mode is effective for decoding substantially horizontally oriented 1D symbols which are at an unknown height in a full field of view. It is seen that the reading of image data of valid zone 12-8 will not result in the decoding of symbol 16-3 because symbol 16-3 is not a 1D symbol. Nevertheless, because valid zone 12-8 intersects symbol bulls-eye 16b, reading of a image data of valid zone 12-8 may be effective to determine that a 2D symbol is likely present in the full field of view of image sensor 132. In one aspect of the invention, reader 110 may be configured to switch out of a partial frame capture mode and into a full frame capture mode when reading of image data captured in the partial frame capture mode reveals that a 2D symbol is likely to be represented in the image data corresponding to the image sensor's full field of view.

The states of operation of reader 110 operating in accordance with the invention are normally selected by actuating appropriate buttons of keyboard 178, or control of a GUI, or by the reading of menuing symbols, as are explained in commonly assigned U.S. Pat. No. 5,929,418 incorporated herein by reference.

It should be apparent that several operating states of the invention are possible. In a first operating state, reader 10 is made to operate only in a partial frame capture mode until the time the first operating state is deactivated.

In a second operating state, as is alluded to in the example of FIG. 1c, the reader operates in a partial frame capture mode until the time that reading of image data captured in the partial frame capture mode reveals that a 2D symbol is likely to be included in the full frame field of view of image sensor 132. When reading of the partial frame of image data reveals that a 2D symbol is likely to be included in a full frame field of view, control circuit 40 captures at least one full frame of image data from sensor 132 and attempts to decode for the 2D symbol determined likely to be represented in the full frame of image data. A reader operating in the second operating state may also be made to switch to a full frame operating mode on the condition that a symbol is not successfully decoding during operation of the reader in the partial frame operating mode.

Figure 1D:
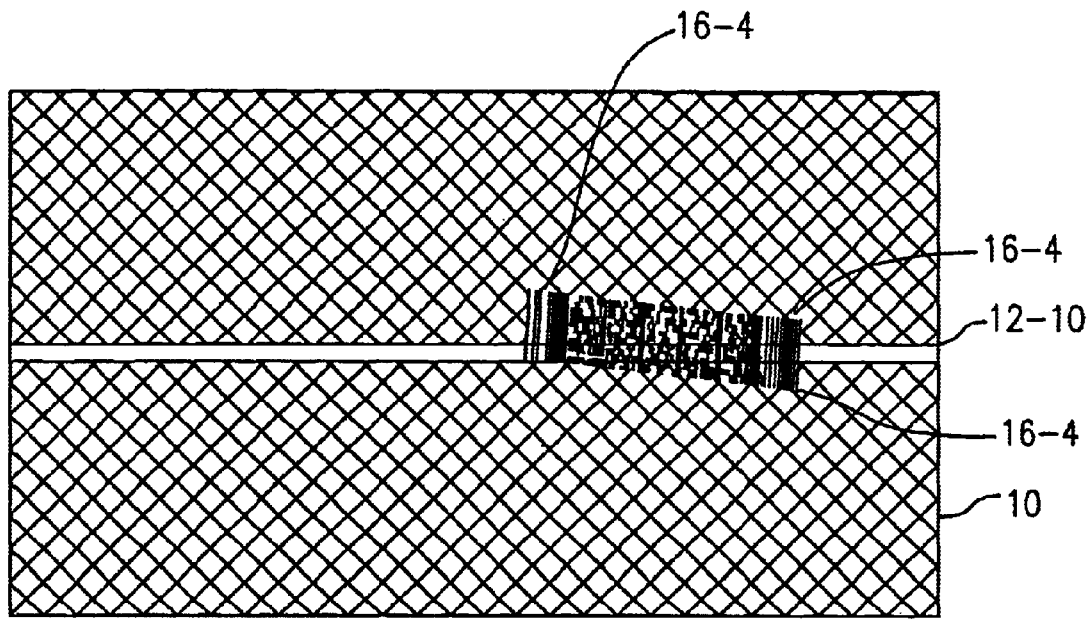

A third operating state of a reader operating in accordance with the invention is described with reference to FIGS. 1*d* and 1*e*. Operating in accordance with a third operating state, a reader operates in a partial frame capture mode to clock out and capture image data of valid zone 12-10 which corresponds to a predetermined pattern and position in field of view 10. It is seen that reading of image data of zone 12-10 will not be effective to decode symbol 16-4 because symbol 16-4 is of a type of 2D symbol known as a stacked linear bar code. Control circuit 140 may nevertheless detect that symbol is a 2D symbol given that valid zone 12-10 intersects a finder pattern 16*f* of symbol 16-4.

Figure 1E:
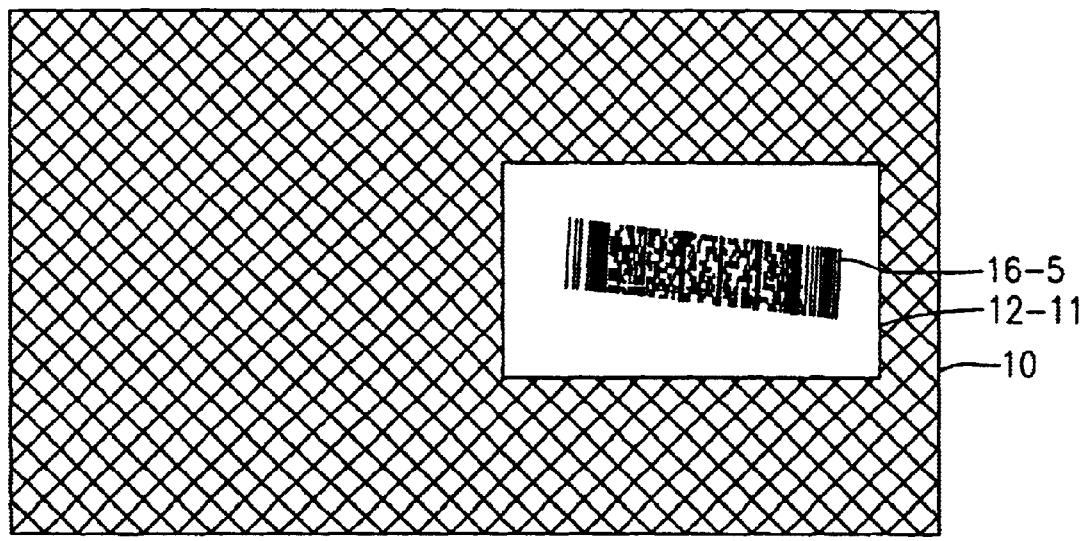
Figure 1F:
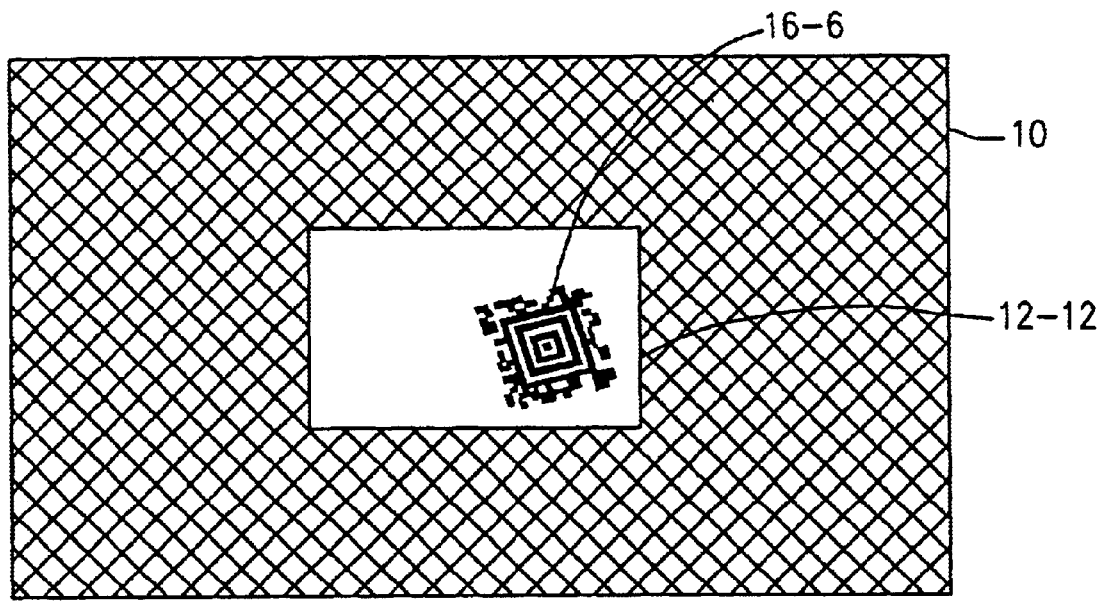
Figure 1G:
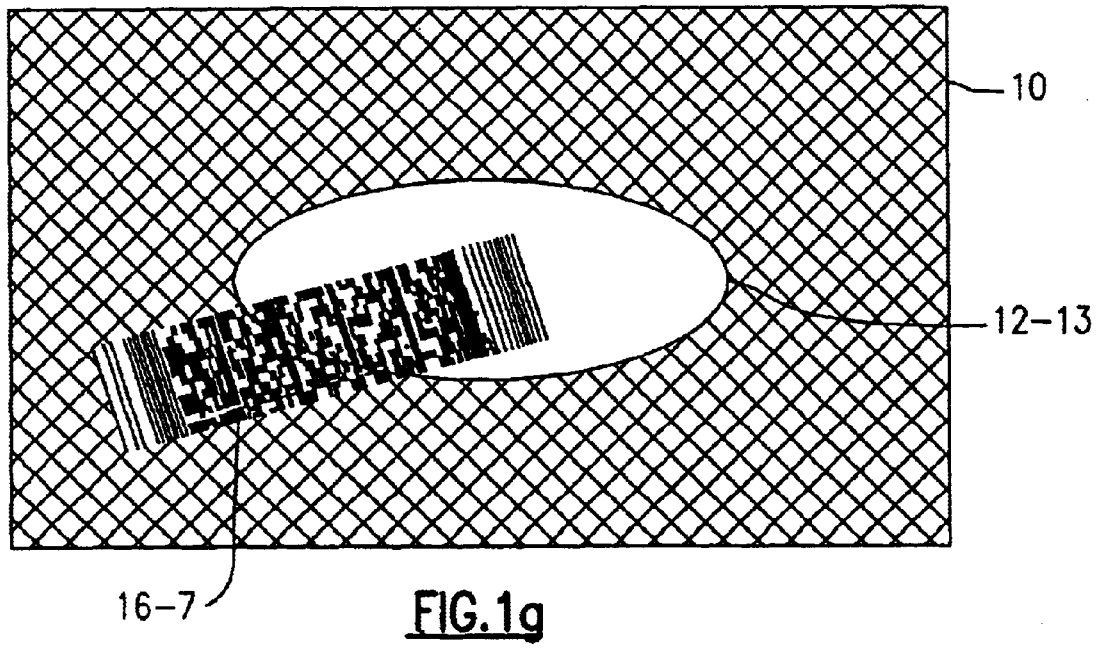

Sensing that a 2D symbol is likely present in the field of view when reading the partial frame image data corresponding to valid zone 12-10, the reader operating in the third operating state then continues to operate in a partial frame mode to clock out and capture image data that defines a second valid zone 12-11 of pixel positions as seen in FIG. 1*e*. The second valid zone 12-11 is not of a predetermined size and position, but rather is of an adaptive position whose position, and possibly size, orientation and shape depends on the result of the reading of the image data corresponding to the first valid zone 12-10. Specifically, the second valid zone 12-11 is normally at least of a size and position that is likely to encompass the symbol 16-4 detected to be present when reading of the image data of first valid zone 12-10. It is seen that the third operating state is likely to be operative to further reduce the clocking out and capture of irrelevant image data, and therefore is likely to further increase decoding speed. In the third operating state, additional adaptive position valid zones may be clocked out and captured if the reading of image data of first adaptive valid zone 12-11 does not result in a symbol being decoded.

In the example of FIGS. 1*f* and 1*g* valid zones 12-12 and 12-13 correspond to nonlinear groupings of pixels. Capturing of the valid zone patterns 12-12 and 12-13 of FIGS. 1*f* and 1*g* is particularly useful for decoding symbol image data in the case that a symbol is likely to be at a certain position in relation to an image sensor's full frame field of view such as in the center of an image sensor's field of view as shown in FIG. 1*f*.

In the example of FIG. 1*f* control circuit 140 can successfully decode symbol 16-6 because symbol 16-6 is located entirely within valid zone 12-12.

In the example of FIG. 1*g*, control circuit 140 cannot decode symbol 16-7 if operating in the first operating state since symbol 16-7 is a 2D symbol and is not entirely located within valid zone 12-13. If operating in the second operating state, then a reader capturing image data within valid zone 12-13 may successfully decode symbol 16-7 by reading the image data of zone 12-13 to determine that a 2D symbol is present, switching operation to a full frame capture mode to capture a full frame 10 of image data, and processing the full frame of image data to decode symbol 16-7. A reader operating in the third operating state described herein above may decode symbol 16-7, in the example of FIG. 1*g*, by reading image data within valid zone 12-13, capturing image data within an adaptively defined valid zone (not shown) of sufficient size and position to encompass symbol 16-7, and then processing the image data within the adaptively defined valid zone to decode symbol 16-7.

While the present invention has been explained with reference to the structure disclosed herein, it is not confined to the details set forth and this invention is intended to cover any modifications and changes as may come within the scope of the following claims.

What is claimed is:

1. A method of operating an optical reader having a 2D image sensor array comprising pixels, said method comprising the steps of:
    (a) generating a partial frame of image data, said partial frame of image data comprising a plurality of generated electrical signals accurately representing an intensity of light incident on a plurality of pixels representing less than all of the pixels of said array;
    (b) capturing said partial frame of image data from said 2D image sensor array corresponding to said plurality of electrical signals generated in step (a); and
    (c) processing said partial frame of image data to recover information.

2. The method of claim 1, wherein said capturing step includes the step of capturing image data corresponding to a linear pattern of pixels.

3. The method of claim 1, wherein said capturing step includes the step of capturing image data corresponding to a plurality of angularly offset linear patterns of pixels.

4. The method of claim 1, wherein said capturing step includes the step of capturing image data corresponding to a plurality of vertically spaced apart horizontally oriented linear patterns of pixels.

5. The method of claim 1, wherein said capturing step includes the step of capturing image data corresponding to a grouping of pixels about a center of said image sensor.

6. The method of claim 1, wherein said processing step includes the step of reading said image data out of a memory device.

7. The method the claim 1, wherein said processing step includes the steps of reading said image data out of a memory device and attempting to decode for a decodable symbol which may be represented in said image data.

8. The method of claim 1, wherein said method further includes the step of capturing a full frame of image data if said processing step reveals that a 2D symbol is likely partially represented in said partial frame of image data.

9. The method of claim 1, wherein said method further includes the step of capturing an adaptively positioned partial frame of image data if said processing step reveals that a 2D symbol is likely partially represented in said partial frame of image data.

10. The method of claim 1, wherein said processing step includes the step of attempting to decode for a decodable symbol represented in said image data, said method further including the step of capturing a full frame of image data if said processing step reveals that a 2D symbol is likely partially represented in said partial frame of image data.

11. The method of claim 1, wherein information comprises a selected one of information decoded from a decodable symbol and information recognized from an optically recognizable character.

12. A method of operating an optical reader having a 2D image sensor array comprising pixels, said method comprising the steps of:

in a partial frame operating mode;

(a) generating a partial frame of image data, said partial frame of image data comprising a plurality of generated electrical signals accurately representing an intensity of light incident on a plurality of pixels representing less than all of the pixels of said array;

(b) capturing said partial frame of image data from said 2D image sensor array corresponding to said plurality of electrical signals generated in step (a); and (c) processing said partial frame of image data to recover information; and if said reader fails to recover information, switching operation of said reader to a full frame capture mode.

13. The method of claim 12, wherein said capturing step includes the step of capturing image data corresponding to a linear pattern of pixels.

14. The method of claim 12, wherein said capturing step includes the step of capturing image data corresponding to a plurality of angularly offset linear patterns of pixels.

15. The method of claim 12, wherein said capturing step includes the step of capturing image data corresponding to a plurality of vertically spaced apart horizontally oriented linear patterns of pixels.

16. The method of claim 12, wherein said capturing step includes the step of capturing image data corresponding to a grouping of pixels about a center of said image sensor.

17. The method of claim 12, wherein information comprises a selected one of information decoded from a decodable symbol and information recognized from an optically recognizable character.

* * * * *